United States Patent

Choi

[11] Patent Number: 5,347,411
[45] Date of Patent: Sep. 13, 1994

[54] APPARATUS FOR DRIVING BRAKES IN A TAPE RECORDER

[75] Inventor: Kwang Moon Choi, Suweon, Rep. of Korea

[73] Assignee: SamSung Electronics Co., Ltd., Suwon, Rep. of Korea

[21] Appl. No.: 821,198

[22] Filed: Jan. 15, 1992

[30] Foreign Application Priority Data

Jan. 31, 1991 [KR] Rep. of Korea ............... 91-1824

[51] Int. Cl.⁵ .............................................. G11B 15/22
[52] U.S. Cl. ................................. 242/341; 360/85; 360/96.1; 360/96.3; 242/355.1
[58] Field of Search ......... 360/85, 96.1, 96.2, 360/96.3, 96.4, 96.5; 242/204, 200, 201

[56] References Cited

U.S. PATENT DOCUMENTS

| | | | |
|---|---|---|---|
| 3,930,268 | 12/1975 | Uemura | 242/204 |
| 4,209,145 | 6/1980 | Erickson | 242/204 |
| 4,635,146 | 1/1987 | Koda et al. | 360/85 |
| 4,708,302 | 11/1987 | Yamaguchi et al. | 360/96.3 |
| 4,779,153 | 10/1988 | Tsubota | 360/96.5 |
| 4,781,339 | 11/1988 | Ahn | 360/96.5 |
| 4,814,912 | 3/1989 | Kleinlein et al. | 242/204 |
| 4,977,467 | 12/1990 | Kondo | 242/204 |
| 5,114,093 | 5/1992 | Kunimaru et al. | 360/96.3 |
| 5,153,790 | 10/1992 | Kobagashi et al. | 360/96.5 |

*Primary Examiner*—Stuart S. Levy
*Assistant Examiner*—Paul J. Ditmyer
*Attorney, Agent, or Firm*—Robert E. Bushnell

[57] ABSTRACT

A brake driving apparatus of a tape recorder includes a reel braking part for driving brakes with a force transferred from a capstan motor to stop the rotation of reels, and a reel releasing part for releasing the brake of the reels by being slidably driven and down with a force transmitted from a loading motor.

27 Claims, 3 Drawing Sheets

APPARATUS FOR DRIVING BRAKES IN A TAPE RECORDER

BACKGROUND OF THE INVENTION

The present invention relates to a tape recorder, and more particularly to a brake driving apparatus for stopping the rotation of reels which wind a tape rotated by the driving force of a capstan motor in a tape recorder such as a video tape recorder or digital audio tape recorder.

In most of tape recorders, the reel for winding the tape is rotated by receiving the driving force from a capstan motor and is stopped by a brake which is driven by a solenoid. Due to the use of the solenoid to drive the brake, however, the cost is increased and space must be allocated for its placement.

In some tape recorders, a reel is stopped by transmitting the driving force of a tape loading motor to a brake through a power transmitting member.

Using the driving force of the tape loading motor, however, can cause the loading motor to be overloaded since it operates many parts in addition to the brake. To overcome the problem, the capacity of the tape loading motor must be increased.

Since the tape loading motor is large in size, the tape recorder is larger and has an increased weight.

Furthermore, due to the establishment of many members for power transmission from the loading motor to the brake, the structure was complicated and the cost was also increased.

Also, since this brake driving apparatus has employed many power transmitting members, a point of time for driving the brake is delayed as much as the time required for power transmission. Thus, the brake driving apparatus is not suitable for the reels which are rotated fast by a fast search function according to the trend toward the development of high function.

SUMMARY OF THE INVENTION

It is an object of the present invention to provide a brake driving apparatus of a tape recorder which brakes a reel quickly by immediately driving a brake with an arm for supporting an idle gear which switches the driving force from a capstan motor to a supply reel or a take-up reel, thereby being suitable for a fast search function, and releasing the brake with a simple structure of slider which receives the driving force from a loading motor, thereby making the braking of the reel smooth.

According to the present invention, there is provided a brake driving apparatus of a tape recorder in which a signal is recorded or reproduced on a tape while the tape is transported along a path, comprising: a reel braking device for driving brakes with a force transferred from a capstan motor for moving a tape, in order to stop the rotation of reels, and a reel releasing device for releasing the brake of the reels by being slidably driven up and lower with a force transmitted from a loading motor.

BRIEF DESCRIPTION OF DRAWINGS

These and other objects, features, and advantages of the present invention will become more apparent from the following description for the preferred embodiments taken in conjunction with the accompanying drawings, in which.

DETAILED DESCRIPTION OF THE INVENTION

The present invention will now be described with reference to the accompanying drawings.

Figure 1:
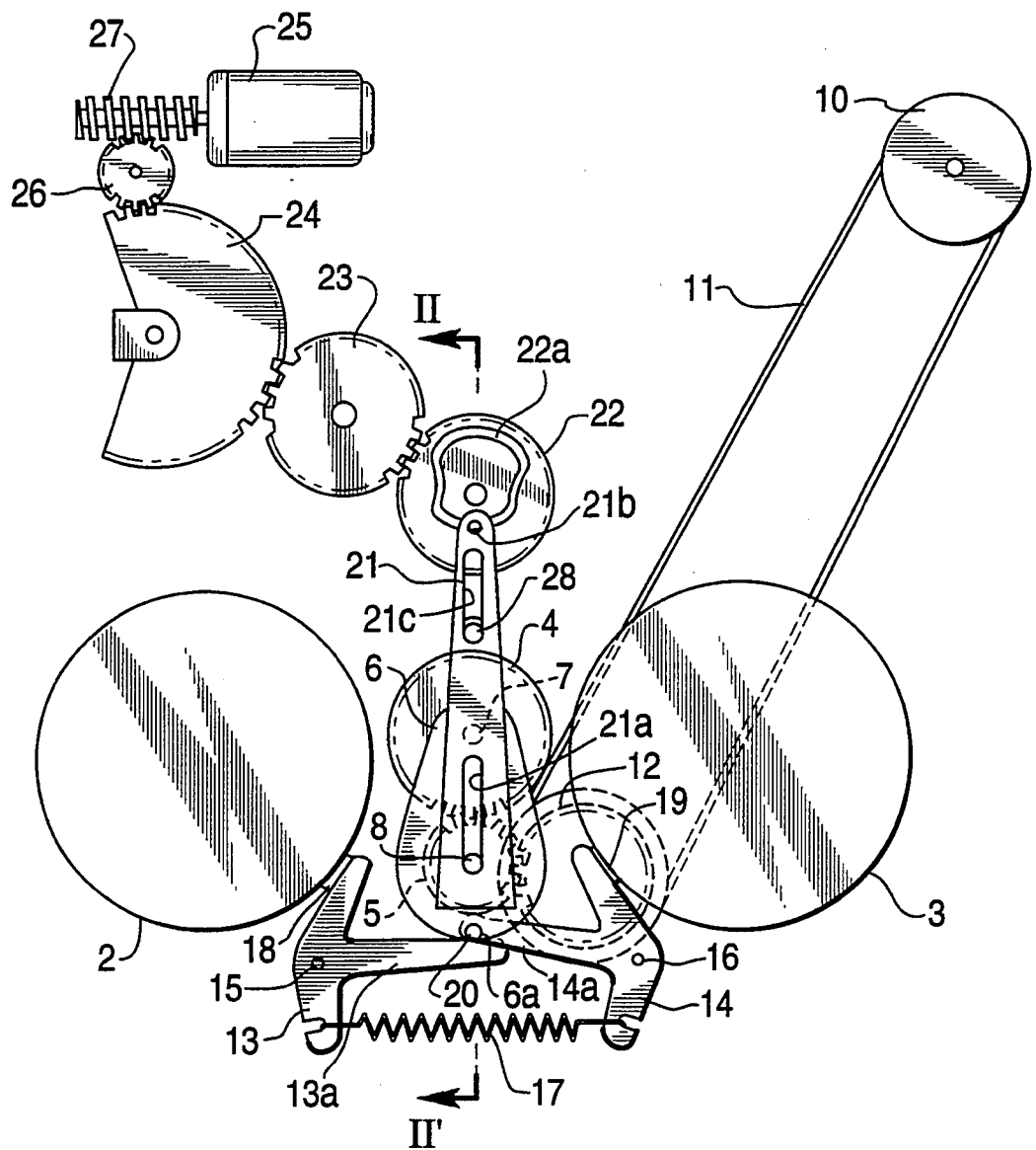
FIG. 1 is a structural view of a tape recorder according to the present invention.
Figure 2:
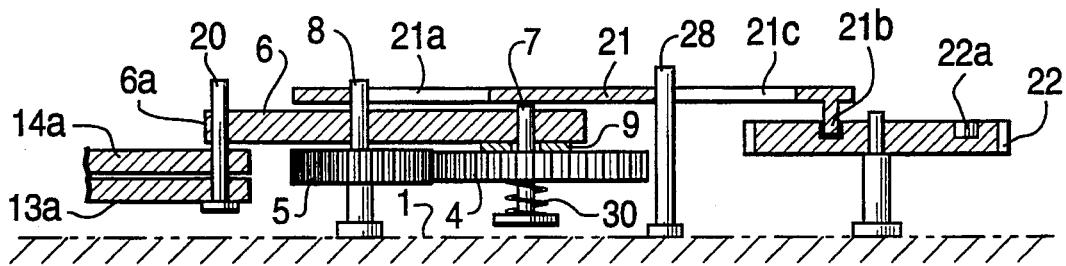
FIG. 2 is a cross-sectional view along an a line II-II' of the tape recorder shown in FIG. 1.
Figure 3A:
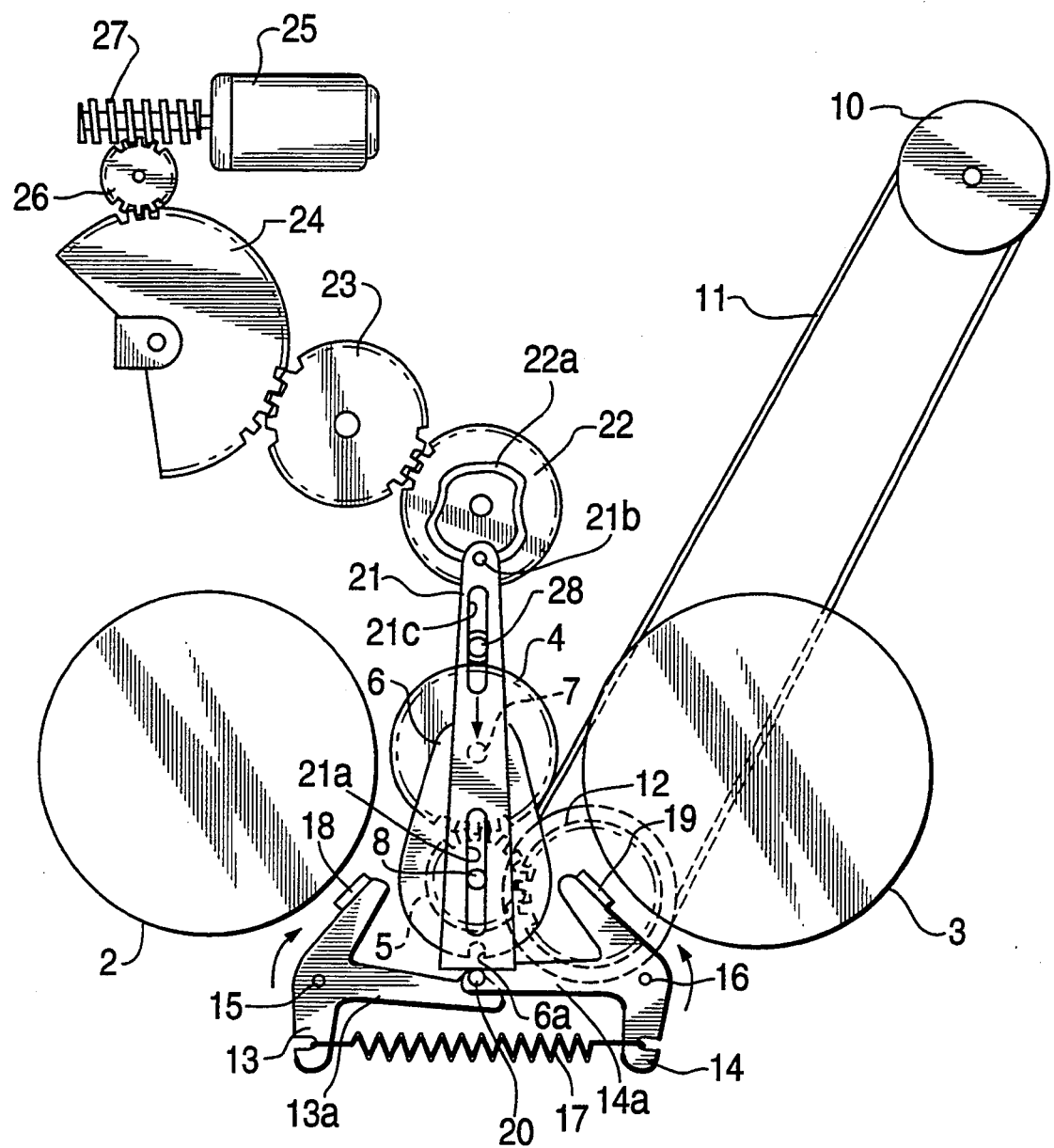
FIGS. 3A and 3B are state diagrams showing the operation of the tape recorder according to the present invention.
Figure 3B:
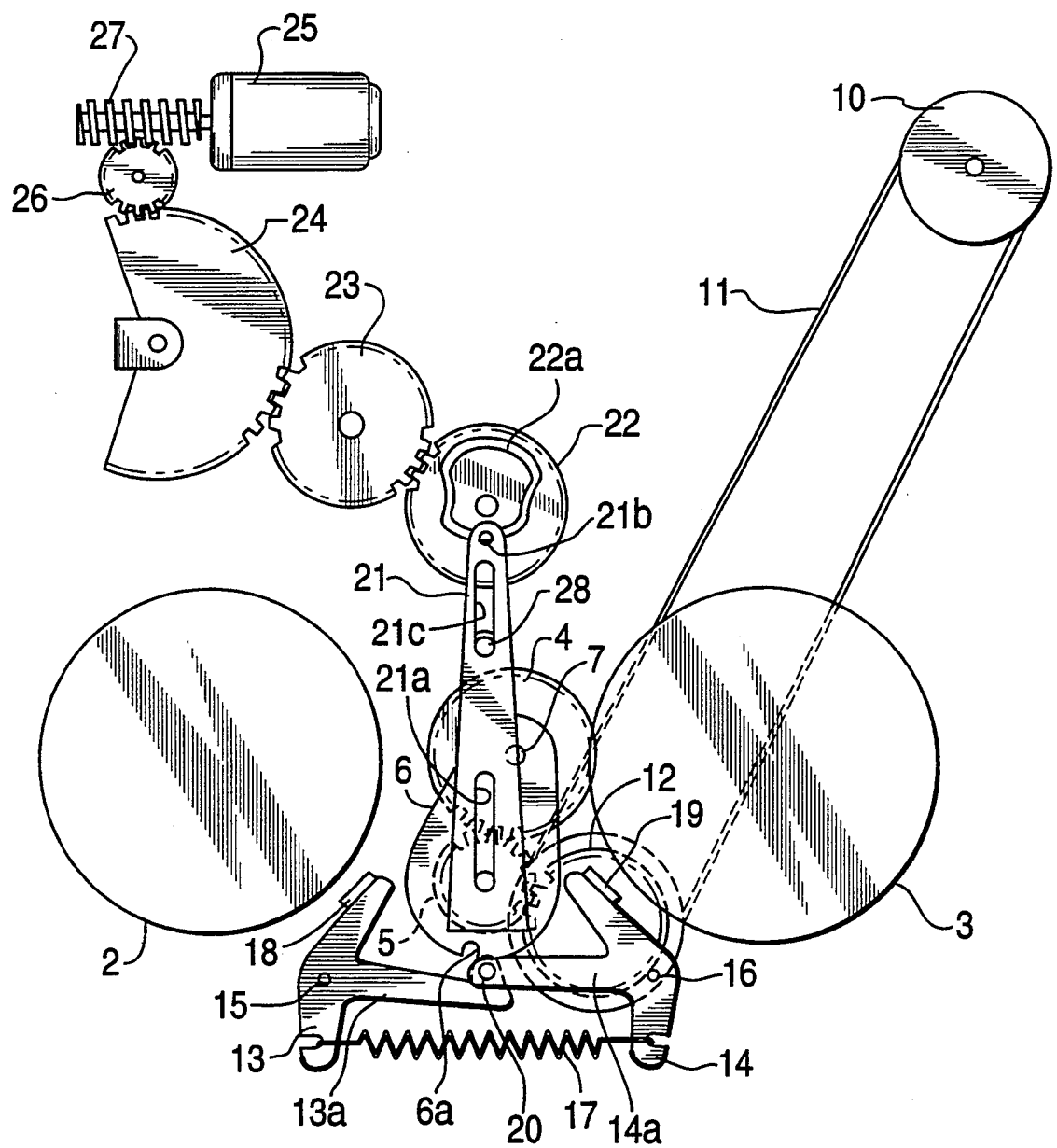

FIG. 1 and FIG. 2 are structural views of a tape recorder according to the present invention, and FIGS. 3A and 3B show the operation status of the tape recorder.

Referring to FIG. 1 and FIG. 2, a supply reel table 2 and a take-up reel table 3 onto which a tape cassette (not shown in figures) is loaded are established on a deck 1 of the tape recorder, and an idle gear 4 and a driving gear 5, which are engaged with each other, are established between the reel tables 2 and 3, fixed by fixing axes 7 and 8 so as to be rotated by an arm 6.

Between the idle gear 4 and the arm 6, a slip generation part 9 is elastically established by a spring 30. The driving gear 5 is engaged with a transmitting gear 12 which is connected by a belt 11 to a capstan motor for moving and rotating the tape.

Established under the reel tables 2 and 3 is also a reel braking device. Brakes 13 and 14 are established to be rotatable on fixed axes 15 and 16, respectively. The brakes 13 and 14 are biased by a spring 17 at their lower sides, and on their upper sides, friction members 18 and 19 are attached to give the friction force, respectively.

Also, levers 13a and 14a formed at a side of the brakes 13 and 14 are connected through a pin 20 to each other so as to be rotatable, and the upper side of the pin 20 is established to be mounted or dismounted on a slot 6a formed at the lower side of the arm 6.

On the other hand, as a reel release device, a slider 21 is established at the upper side of the arm 6 where the idle gear 4 and the driving gear 5 are established, and at the lower side of the slider is formed a long hole 21a where the fixed axis 8 for fixing the driving gear 5 is inserted.

At the upper side of the slider 21 is an engaging pin 21b which is inserted into a cam slot 22a of a gear 22.

Subsequently, the gear 22 is engaged with another gear 23 which is also engaged with a side of a sector gear 24, and the other side of the sector gear 24 is engaged with a worm gear 26 which is engaged with a worm 27 of a loading motor 25.

According to the present invention described above, in an initial stop mode, the idle gear 4 and the arm 6 for supporting the idle gear 4 are at the middle position between both reels 2 and 3 and the pin 20 which connects the levers 13a and 14a of the brakes 13 and 14 in the reel braking means to each other is mounted to the slot 6a of the arm 6, so that the friction members 18 and 19 of the brakes 13 and 14 are in a state of applying the brake to the reels 2 and 3.

Thus, the reels 2 and 3 are in a stopped state and the lower side of the slider 21 is in a separated state in a specified distance from the pin 20, since the engaging pin 21b at the upper side of the slider 21 is positioned in the cam slot 22a near to the center of the gear 22. If the stop mode is converted to a fast forward (FF) mode for fast search, the loading motor 25 and the capstan motor 10 are rotated together.

The transmitting gear 12, which is connected through the belt 11 is also rotated counterclockwise by the rotation of the capstan motor 10.

The transmitting gear 12 rotates the driving gear 5 clockwise, thereby rotating the idle gear 4 counterclockwise.

At this time, the arm 6 and the idle gear 4 are to be moved toward the take-up reel 3, but, since the pin 20 which connects the levers 13a and 14a of the brakes 13 and 14 is in a mounted state onto the slot 6a of the arm 6, there is generated a slip by the slip generation part 9 between the arm 6 and the idle gear 4.

Accordingly, the arm 6 and the idle gear 4 are not moved and only the idle gear 4 is in an idly rotational state.

On the other hand, if the rotational force of the loading motor 25 which is rotated with the capstan motor 10 is transmitted to the gear 22 through the sector gear 24 and the gear 23 after it is reduced by the worm 27 and worm gear 26 and then the gear 22 is once rotated clockwise, the engaging pin 21b of the slider 21 at the position of the cam slot 22a near the center of the gear 22 is moved to a position of the cam slot 22a distant from the center of the gear 22, as shown in FIG. 3(A) and thus the slider 21 is moved downward.

Then, the slider 21 is moved straight, pushing the pin 20 mounted on the slot 6a of the arm 6, since its long hole 21a is mounted on the fixed axis 8. According to the continued rotation of the gear 22, the slider 21 is returned to the position of the initial stop mode state.

Accordingly, since the pin 20 is instantaneously pulled from the slot 6a of the arm 6, the spring 17 is extended and the brakes 13 and 14 are rotated on the fixed axes 15 and 16, taking off the brake of the reel tables 2 and 3. The arm 6 and the idle gear 4 are moved to the take-up reel table 3, so that the idle gear 4 rotates the take-up reel table 3, thereby performing the fast search operation.

According to the movement of the arm 6, the pin 20 mounted on the slot 6a of the arm 6 is in contact with the lower side of the arm 6 by the compressing force of the spring 17 interconnected between the brakes 13 and 14, so that the reel tables 2 and 3 are continuously maintained at the releasing state of the brake.

Also, if the fast search mode is again converted to the stop mode to stop the tape at a desired position after performing the fast search operation, the capstan motor 10 is reversely rotated for a short time and is then stopped. At the same time, the loading motor 25 is reversely rotated, too, thereby reversely rotating the gear 22 once.

According to the short-time reverse rotation of the capstan motor 10, the idle gear 4 and the driving gear 5 are also rotated reversely, thereby moving the arm 6 toward the center position again.

The pin 20 which has pressed the circumference of the arm 6 by the compressing force of the spring 17 connected between the brakes 13 and 14 enters the slot 6a of the arm 6 again.

Then, the brakes 13 and 14 are again rotated respectively on the fixed axes 15 and 16. Thus, the friction members 18 and 19 are in contact with the reel tables 2 and 3, thereby stopping them.

At this time, the capstan motor 10 is stopped, while the loading motor 25 keeps rotating reversely. Subsequently, by one rotation of the gear 22, the engaging pin 22b of the slider 21 is guided to the cam slot 22a of the gear 22, so that the slider 21 is once moved upward and downward.

Thus, the lower side of the slider 21 pulls the pin 20 mounted on the slot 6a and the arm 6, thereby releasing the brake of the reel tables 2 and 3 and braking them again instantly.

Therefore, the tension of the tape that may be overloaded in braking the brakes 2 and 3 can be alleviated and this is achieved by making the operation of the arm 6 which is driven by the reverse rotation of the capstan motor 10 faster than that of the gear 22 which is rotated by the driving force of the loading motor 25 that is transmitted through the gear 23 and the power transmitting members 24.

According to the brake driving apparatus described hereinabove, since the braking and releasing of the reels are smoothly performed by the reel braking device and the reel releasing device, the cost is decreased by simplifying its parts, and particularly the braking point of the reels is shortened by driving directly the brake with the arm of the reel braking device which is operated by the transmission of the driving force of the capstan motor. Thus, the present invention is suitable for the fast search function.

In addition, the reels are released from the braking state by the reel releasing device for a short time and are braked again, so that the present invention alleviates the tension of the tape that may be overloaded.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the present invention.

What is claimed is:

1. A brake driving apparatus of a tape recorder, said apparatus comprising:

reel braking means for braking reel tables with a force transferred from capstan motor means, said capstan motor means for transporting a tape by driving said reel tables, said reel braking means comprising:

an arm having a slot and being rotated on a fixed axis by a driving force transmitted from said capstan motor means, brakes for engaging said reel tables and being rotated on stationary axes, said brakes being biased by a spring, and a pin connecting said brakes to each other and for being mounted into and dismounted from said slot of said arm; and reel releasing means for releasing said brakes to enable rotation of said reel tables, said reel releasing means being slidably driven by a loading motor.

2. The brake driving apparatus of a tape recorder as claimed in claim 1, wherein said brakes comprise two brake levers, each one of said brake levers being allowed to rotate into engagement with a corresponding one of said reel tables by said reel braking means, and said each one of said brake levers being urged out of engagement with said corresponding one of said reel tables by said reel releasing means.

3. A brake driving apparatus of a tape recorder, said apparatus comprising:

reel braking means for braking reel tables with a force transferred from capstan motor means, said capstan motor means for transporting a tape by driving said reel tables, said reel braking means comprising:

an arm having a slot and being rotated on a fixed axis by a driving force transmitted from said capstan motor means, brakes for engaging said reel tables and being rotated on stationary axes, said brakes being biased by a spring, and a pin connecting said brakes to each other and for being mounted into and dismounted from said slot of said arm; and reel releasing means for releasing said brakes to enable rotation of said reel tables, said reel releasing means being slidably driven by a loading motor, said reel releasing means comprising:

a gear having a cam portion and being rotated by a driving force transmitted from said loading motor, and a slider having a protuberance engaging said cam portion to be translated longitudinally by the rotation of said gear.

4. A tape recorder, comprising:

a deck;

reel tables, rotatably attached to said deck, for engaging reels of a tape cassette;

capstan motor means for transporting tape in said tape cassette by driving rotation of said reel tables;

loading motor means for enabling loading of said tape;

means for enabling driving of brakes against said reel tables, said brake driving enabling means being powered by said capstan motor means, said brake driving enabling means comprising a pivoting arm having a slot formed in an outer edge for receiving a riding member of said brakes; and means for disabling driving of said brakes against said reel tables, said brake driving disabling means being driven by said loading motor means;

said brakes being driven against said reel tables when said riding member of said brakes is seated in said slot, and said brakes not being driven against said reel tables when said riding member of said brakes is unseated from said slot by said brake driving disabling means;

said brakes comprising two brake levers, each one of said brake levers being allowed to rotate into engagement with a corresponding one of said reel tables by said brake driving enabling means, and each one of said brake levers being urged out of engagement with said corresponding one of said reel tables by said brake driving disabling means.

5. A tape recorder as claimed in claim 4, wherein said brake driving disabling means comprises:

cam means, rotated by said loading motor means, for providing a predetermined displacement in response to a rotational position; and a slier, driven in response to said rotational position of said cam means, for pivoting said brakes out of engagement with said reel tables.

6. A tape recorder as claimed in claim 5, wherein said brakes comprise:

friction pads for frictionally engaging said reel tables; and brake levers carrying said friction pads and pivotally attached to said deck.

7. A tape recorder as claimed in claim 4, wherein said brake driving disabling means comprises:

means for pivoting said riding member of said brakes out of engagement with said slot to enable an idle gear to traverse into engagement with one of said reel tables, said idle gear being rotatably supported by said pivoting arm.

8. A tape recorder, comprising:

a deck;

a reel table, rotatably attached to said deck, for engaging a reel of a tape cassette;

a brake lever for braking said reel table, comprising a riding portion;

capstan motor means for transporting tape in said tape cassette by driving rotation of said reel table;

loading motor means for driving loading of said tape;

driving gear means driven by said capstan motor means;

an arm being pivotally supported by an axle of said driving gear and comprising an edge portion for engaging said riding portion of said brake lever;

idle gear means engaging and driven by said driving gear and being supported by said arm, said idle gear for selectively engaging said reel table; and means, driven by said loading motor, for disengaging said riding portion of said brake lever from said edge portion of said arm.

9. The tape recorder as claimed in claim 8, further comprised of said arm having a slot formed in said edge portion for receiving said riding portion of said brake lever.

10. The tape recorder as claimed in claim 9, wherein said brake lever is driven against said reel table when said riding portion of said brake lever is seated in said slot, and said brake lever is not driven against said reel table when said riding portion of said brake lever is unseated from said slot by said disengaging means.

11. A tape recorder as claimed in claim 8, further comprising means for providing a frictional coupling between said arm and said idle gear so that idle gear is pivoted into engagement with said reel table in response to a direction of rotation of said driving gear means.

12. A tape recorder as claimed in claim 8, wherein said arm further comprises a slot portion for receiving said riding portion, wherein said riding portion is seated in said slot portion when said brake lever is in a position for braking said reel table.

13. A tape recorder as claimed in claim 12, wherein said disengaging means comprises:

cam means, rotated by said loading motor means, for providing a predetermined displacement in response to a rotational position; and a slider, driven in response to said rotational position of said cam means, for unseating said riding portion from said slot portion thereby rotating said brake lever out of a position for braking said reel table.

14. A tape recorder as claimed in claim 13, wherein during a transition from a stop mode of said tape recorder to a winding mode in which said reel table is rotated to wind said tape, said cam means is rotated by said loading motor means thereby translating said slider to unseat said riding portion from said slot portion.

15. A tape recorder as claimed in claim 14, wherein during said winding mode said riding portion rides on an outer surface of said arm, not in said slot portion.

16. A tape recorder as claimed in claim 14, wherein said capstan motor means is rotated in an opposite direction upon termination of said winding mode to pivot said arm and seat said riding portion in said slot portion allowing said brake lever to rotate into a position to brake said reel table.

17. A tape recorder as claimed in claim 12, further comprising:
a slider, driven by said loading motor means, for unseating said riding portion from said slot portion so that said idle gear means is released to freely rotate into engagement with said reel table.

18. A tape recorder as claimed in claim 12, wherein said brake lever comprises a friction member for engaging said reel table.

19. A tape recorder as claimed in claim 8, wherein said edge portion comprises a slot for receiving said riding portion to enable said brake lever to rotate into a position for braking said reel table.

20. A tape recorder as claimed in claim 19, wherein said edge portion further comprises a raised portion surrounding said slot for engaging said riding portion to bias said brake lever into a position for releasing said braking of said reel table.

21. A tape recorder as claimed in claim 19, wherein said brake lever comprises a friction member for engaging said reel table.

22. A tape recorder as claimed in claim 8, wherein said brake lever comprises a friction member for engaging said reel table.

23. A tape recorder, comprising:
a deck;
reel tables, rotatably attached to said deck, for engaging reels of a tape cassette;
capstan motor means for transporting tape in said tape cassette by driving rotation of said reel tables;
loading motor means for enabling loading of said tape;
means for enabling driving of a first brake against one of said reel tables, said brake driving enabling means being powered by said capstan motor means, said brake driving enabling means comprising a pivoting arm having a slot formed in an outer edge for receiving a riding member of said first brake; and
means for disabling driving of said first brake against one of said reel tables, said brake driving disabling means being driven by said loading motor means;
said first brake being driven against one of said reel tables when said riding member of said first brake is seated in said slot, and said first brake not being driven against one of said reel tables when said riding member of said first brake is unseated from said slot by said brake driving disabling means.

24. A tape recorder as claimed in claim 23, further comprised of said brake driving enabling means comprising:
said pivoting arm having said slot being rotated on a fixed axis by a driving force transmitted from said capstan motor means; and
said riding member connecting said first brake to a second brake and for being mounted into and dismounted from said slot of said pivoting arm.

25. A tape recorder as claimed in claim 24, wherein said brake driving disabling means comprises:
a gear having a cam portion and being rotated by a driving force transmitted from said loading motor means; and
a slider having a protuberance engaging said cam portion to be translated longitudinally by the rotation of said gear.

26. A tape recorder as claimed in claim 24, wherein said brake driving enabling means further comprises said pivoting arm having said slot formed in said outer edge for receiving said riding member of said first and second brakes.

27. A tape recorder as claimed in claim 26, wherein said first and second brakes are driven against said reel tables when said riding member of said first and second brakes is seated in said slot, and said first and second brakes are not driven against said reel tables when said riding member of said first and second brakes is unseated from said slot by said brake driving disabling means.

* * * * *

UNITED STATES PATENT AND TRADEMARK OFFICE
CERTIFICATE OF CORRECTION

PATENT NO. : 5,347,411
DATED : September 13, 1994
INVENTOR(S) : Kwang- Moon Choi It is certified that error appears in the above-indentified patent and that said Letters Patent is hereby corrected as shown below:

Column 1,

Line 60    Change "lower" to --down--;

Signed and Sealed this

Nineteenth Day of November, 1996

Attest:

BRUCE LEHMAN

*Attesting Officer*    *Commissioner of Patents and Trademarks*